(12) United States Patent
Perez et al.

(10) Patent No.: US 6,406,654 B1
(45) Date of Patent: Jun. 18, 2002

(54) WAX PATTERN MOLD WITH STRIPABLE CORE

(75) Inventors: Jose G. Perez, Carlsbad; Mike Steve Bujdos, Oceanside; Terrill R. McCabe, Carlsbad, all of CA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/375,812

(22) Filed: Aug. 17, 1999

(51) Int. Cl.⁷ .............................................. B29C 39/04
(52) U.S. Cl. ..................... 264/225; 264/328.2; 264/334; 425/186; 425/190; 425/468; 425/DIG. 10; 249/64; 249/177
(58) Field of Search .............................. 264/328.2, 334, 264/225; 425/186, 190, 441, 468, 577, DIG. 10; 249/63, 64, 142, 177; 164/340, 341, 346

(56) References Cited

U.S. PATENT DOCUMENTS

| | | | |
|---|---|---|---|
| 3,124,842 A | 3/1964 | Moormann | 425/302.1 |
| 3,856,256 A | 12/1974 | Celesti | 249/66.1 |
| 5,204,046 A | 4/1993 | Schmidt | 264/328.1 |
| 5,417,559 A | 5/1995 | Schmidt | 425/186 |
| 5,429,365 A * | 7/1995 | McKeighen | 273/173 |
| 5,547,630 A | 8/1996 | Schmidt | 264/297.2 |
| 5,651,409 A * | 7/1997 | Sheehan | 164/412 |
| 5,908,643 A * | 6/1999 | Yost et al. | 425/186 |

* cited by examiner

Primary Examiner—Nam Nguyen
Assistant Examiner—Donald Heckenberg
(74) Attorney, Agent, or Firm—Swidler Berlin Shereff Friedman, LLP

(57) ABSTRACT

A wax pattern mold and molding process are disclosed for forming a wax pattern of a hollow, thin walled object, in particular, a golf club head. A mold is provided in at least two halves defining a mold cavity. A core made up of a plurality of interfitted parts is placed in the mold to precisely define the thin walls. The core and mold are provided with a registration channel such that the core is properly registered in the cavity to ensure dimensional integrity of the thin walls. Pins, holes, slots, and fingers are provided to lock the core parts together while the wax pattern is formed and to permit the core parts to be disassembled through an opening in the mold without separating the mold halves.

6 Claims, 15 Drawing Sheets

WAX PATTERN MOLD WITH STRIPABLE CORE

BACKGROUND OF THE INVENTION

The present invention relates to lost wax casting of thin walled hollow objects, especially metal golf club heads, more particularly to the molding process for creating the wax pattern of the club head to be cast, and even more particularly to a core for; a wax mold that can be readily stripped from the mold without first removing the wax pattern therefrom.

Many golf clubs, in particular the metal woods, have hollow metal heads with precisely formed thin walls to provide advantages in striking a golf ball. Typically such heads are made by lost wax casting. Precision is required in the casting process in order to ensure that precise dimensions are maintained so that the final product incorporates the advantages which may be achieved from the thin walled head. Such thin walls have created difficulties in the casting process due, at least in part, to the need to provide a core to create the hollow wax pattern, which core must be stripped from the wax pattern before use. The typical prior art process required a skilled operator to open the wax pattern mold and remove the core from the wax pattern by hand. Such hand stripping of the core often causes deformation or other damage to the wax pattern, which jeopardizes the precision of the casting.

A wax pattern molding process using a stripable core which attempts to address some of these difficulties with the prior art is described in U.S. Pat. Nos. 5,204,046, 5,417,559 and 5,547,630. In these patents, a molding process is described in which a core made of multiple pieces, held together by T-shaped sliding interconnections, is wedged within a double door mold. One door of the mold creates at least part-of the mold cavity and the second door has a wedge which forces the core in place within the cavity. While addressing certain difficulties with stripping of the mold, this solution is not ideal. In particular, the wedging action which holds the core in place does not necessarily guarantee the precise positioning of the core due to inconsistencies as a result of force application being dependent on the degree of mold closure in such a wedging arrangement. Also the double door configuration adds complication to the mold. There thus remains a need in the art for an easily stripable mold which locates the core with precision.

SUMMARY OF THE INVENTION

It is therefore an object of the invention to provide a wax pattern mold with a stripable core that permits greater control over dimensional integrity of the walls of hollow thin walled objects to be molded.

This and other objects are achieved according to the present invention by a mold which comprises a mold body and a mold core. The mold body is made up of at least two mating parts together defining a cavity configured and dimensioned to define the outside of the hollow object to be molded, preferably the wax pattern of a metal wood golf club head. The mold parts also define a channel for delivering molten wax to the cavity and an opening configured and dimensioned to receive the mold core therethrough and extending into the cavity. The mold parts are separable to remove the molded object. In a preferred embodiment, the mold body parts are two halves hinged together for opening and closing.

The mold core has an upper portion configured and dimensioned to define the inside of the hollow object to be molded and a stem portion configured and dimensioned to be received in the mold body opening and mate with the mold body parts. The core is made up of a plurality of interfitted parts configured and dimensioned to be sequentially removable through the mold body opening without opening the mold halves. Also part of the invention are means for registering the position of the mold core in the mold cavity, and means for locking the core parts together.

According to one embodiment of the invention, the registering means comprises at least one registration member extending out from the core stem and at one least recess defined in the mold body around the mold body opening to receive the registration member in close fitting, positive engagement. In various alternative embodiments the registration member is a ridge formed at least partly around the core stem, at least one pin extending out from the core stem or a key extending out from the core stem wherein the recess receiving the registration member is a keyway.

In another alternative embodiment the registering means comprises at least one registration member extending out from the mold body around the mold body opening and at least one recess defined in the core stem to once again receive the registration member in close fitting, positive engagement. The same alternatives are again possible, in opposite relationship.

According to a further aspect of the invention, locking means comprises an extendable locking finger mounted on one core part and a slot for receiving the finger defined in a mating core part. In an alternative embodiment, locking means may comprise a locking member and at least one slot for receiving the locking member, wherein the slot is formed in one of the mold parts and the locking member bears against the core to lock the core in position when received in the slot. According to this alternative, the locking member may comprise an extendable locking finger disposed on an outer surface of the core, the finger being extendable from the core to be received in the slot, or a locking gate, slidably received over the core in two opposed slots defining in the mold parts. In further alternative embodiments, the locking means may comprise dowels inserted through close-fitting holes in the core stem portion to lock the parts together, either through the mold body or outside the mold body, or a locking gate carried in grooves in the mold body that bears against the mold stem portion.

The core according to the invention also may comprise a base plate with one of the plurality of core parts fixed thereto and a plurality of upstanding pins also fixed to the base plate. In this embodiment the other core parts have holes defined in them to receive the pins such that the parts may be removably assembled over the pins.

A further aspect of the invention is a method for forming a wax pattern of a hollow, thin walled object, such a golf club head, including the following steps: providing a wax pattern mold made up of at least two parts together defining a cavity configured and dimensioned to form the outside of the wax pattern, placing in the mold cavity a core configured and dimensioned form the hollow inside of the wax pattern wherein said core is comprised of multiple core parts, said placing including registering the core with the mold cavity to ensure dimensional integrity of the thin walls of the object, closing the mold parts together, locking the multiple core parts together in a step separate from said placing step, flowing molten wax into the mold cavity, permitting the wax to harden to form the thin walled wax pattern, removing the core while maintaining mold parts closed, opening the mold parts, and removing the wax pattern.

BRIEF DESCRIPTION OF THE DRAWINGS

The features and advantages of the present invention will be more readily apparent from the following detailed description illustrated in the drawing figures, wherein.

DETAILED DESCRIPTION OF THE INVENTION

Figure 1:
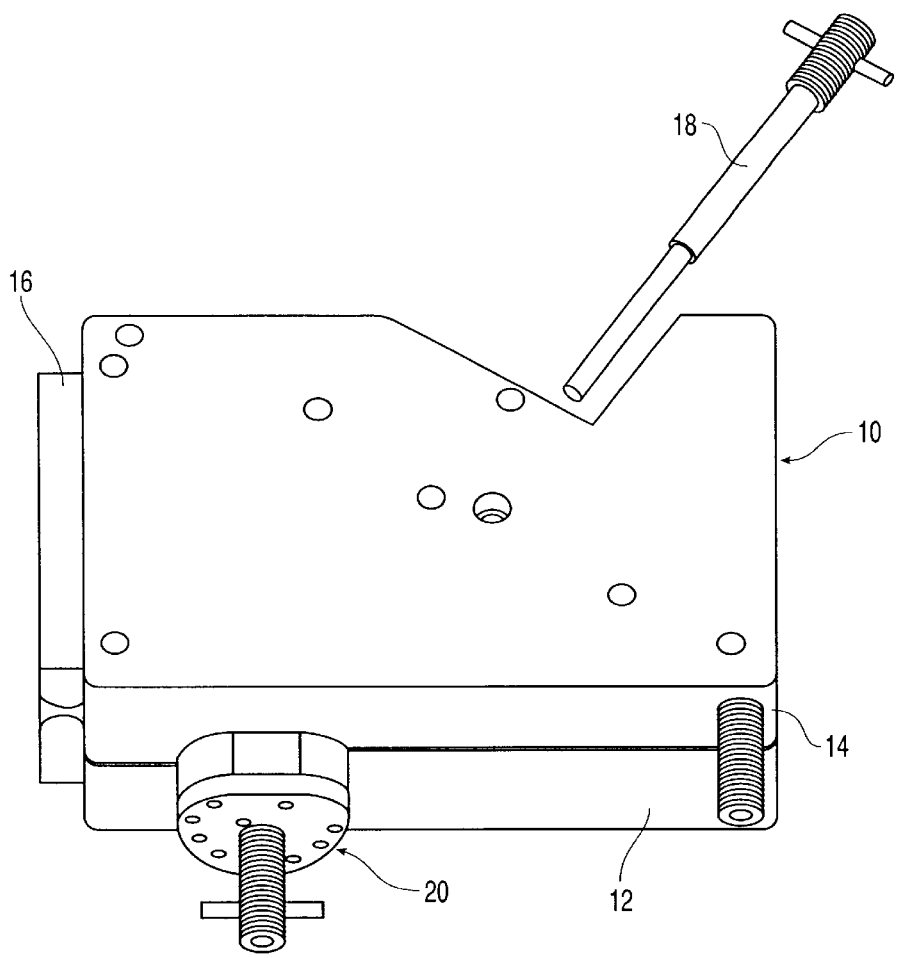
FIG. 1 is a perspective view of a closed wax pattern mold according to the present invention with the core in place.

Referring to FIG. 1, wax pattern mold 10 for forming the wax pattern of a metal wood is shown with core 20 in place. The mold is preferably made of two mold halves 12, 14 (although any number of mold parts may be used), held together at one side by hinge 16. Shown outside the mold is hosel pin 18, which forms the core for the hosel portion of the wax pattern club head. Note that throughout the description and FIGS. numbers are repeated where they refer to similar parts.

Figure 3:
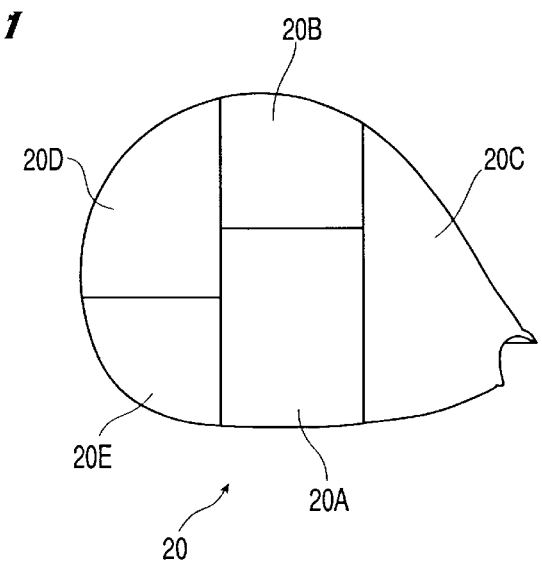
FIG. 3 is a top side view of the core of FIG. 2.
Figure 2:
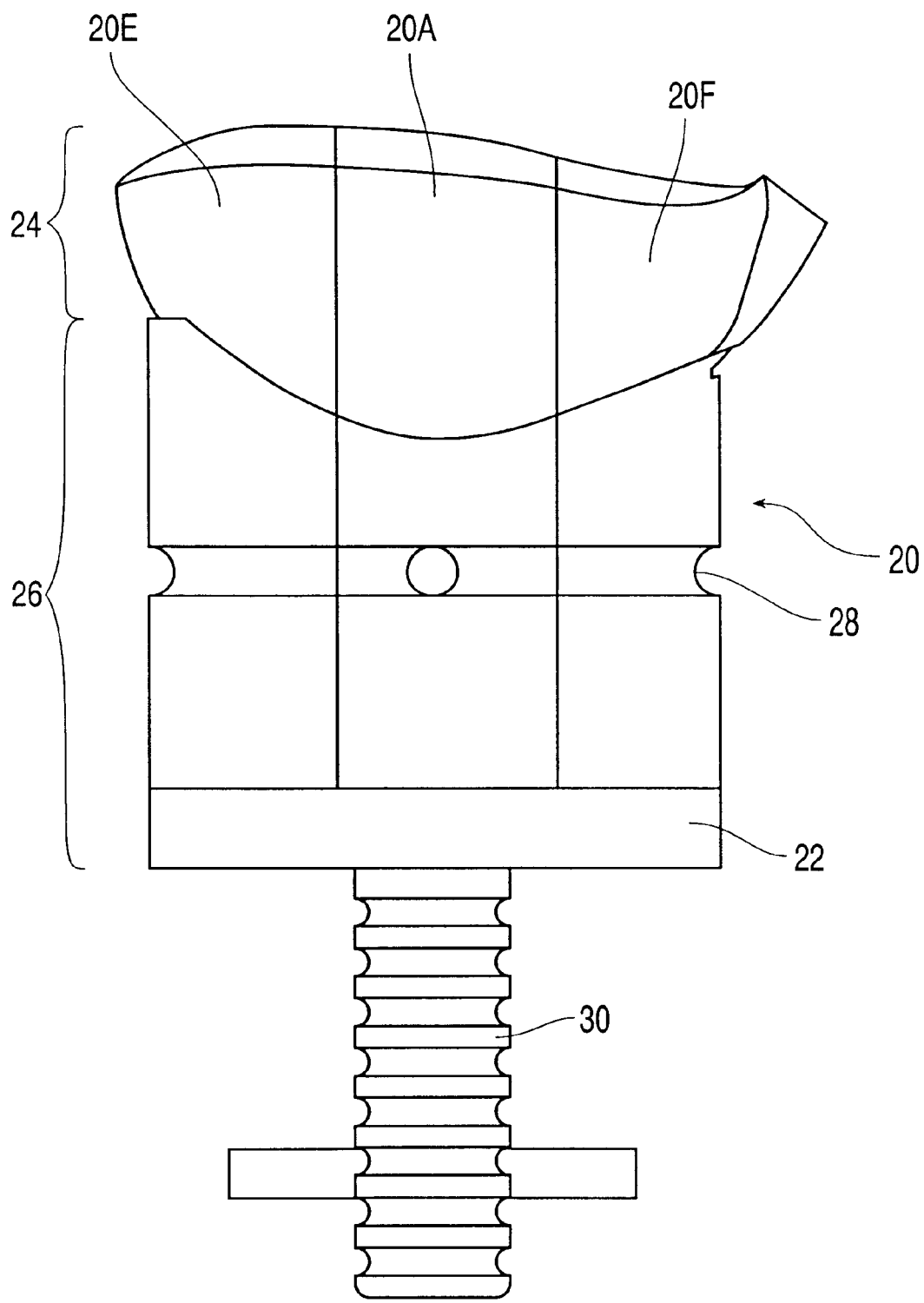
FIG. 2 is an enlarged side view of one embodiment of stripable core according to the present invention.

Enlarged views of the core are shown in FIGS. 2 and 3. In this embodiment core 20 includes a plurality of core pieces 20A–F, mounted on base plate 22. In this case, six core pieces are shown by way of example, but any number may be used. Upper core portion 24 is shaped to match the hollow interior of the club head and, in combination with the mold cavity, provide the precise wall thickness for the thin club head walls. Core stem portion 26 is smaller in diameter, to match the opening in the sole of the club head (the opening through which the core is stripped) and is held between mold halves 12, 14 to ensure precise positioning of the core. It is not required that the opening be through the sole. Alternatively, the opening may be provided through the face or the crown of the club head. The opening also may be provided in the heel of the club, but that may require that the core be made up of a higher number of pieces due to the heel having a smaller area than other club surfaces. Registration channel 28 extends at least partially around core stem portion 26. Channel 28 cooperates with registration ring 46 (FIG. 4) to precisely locate the core with respect to the mold cavity, as explained in greater detail below. Rotatable handle 30 controls the internal locking finger 56 (see FIG. 6) which holds the core together while in the mold.

Figure 4:
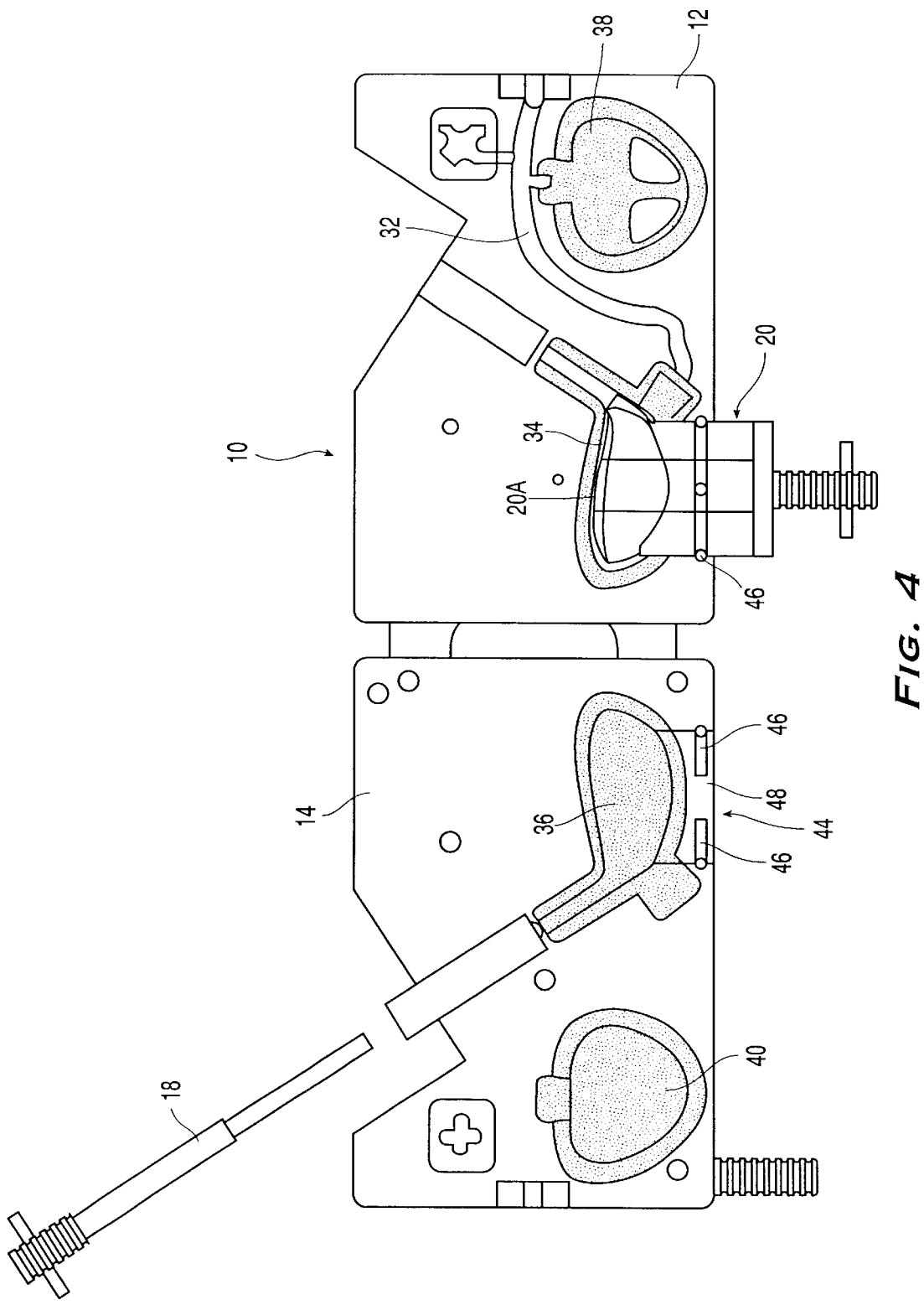
FIG. 4 is a plan view of an open mold according to an embodiment of the invention, with the core in place.
Figure 11:
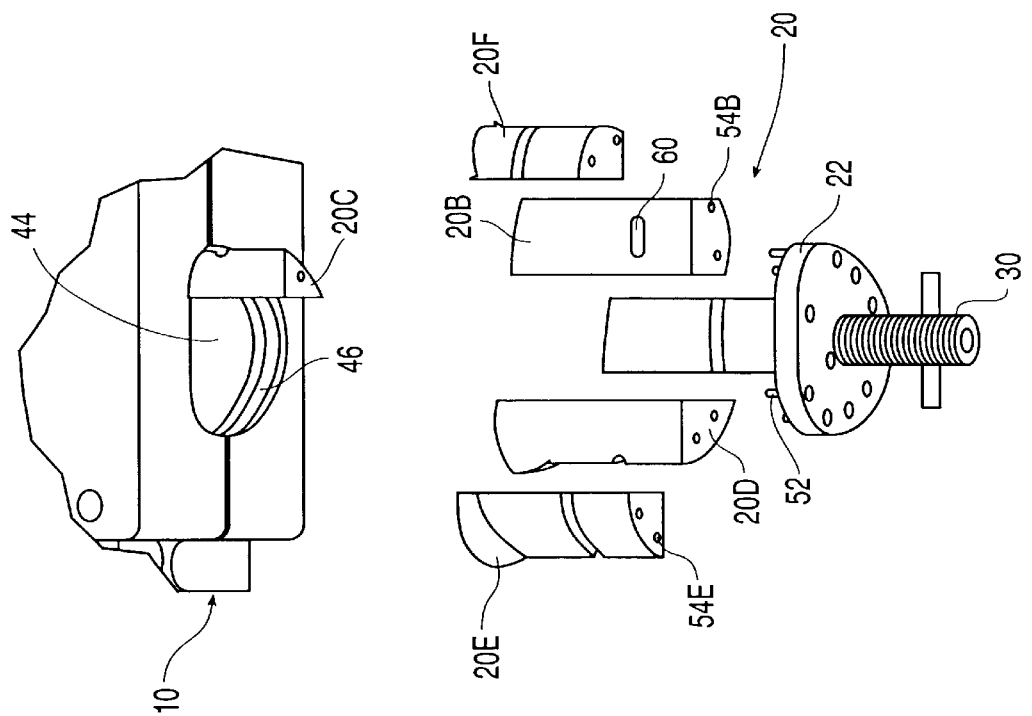

Core 20 is shown in place in open mold 10 in FIG. 4. As is generally known in the art, mold halves 12 and 14 provide wax flow channel 32, cavity halves 34, 36 for the club head and cavity halves 38, 40 for the sole plate. Preferably the cavity halves may be lined with epoxy. At the bottom of each mold half is a recess that defines the mold core opening 44 (best seen, for example, in FIG. 11). Mold core opening 44 has registration ring 46 disposed therearound to mate with registration channel 28 in core stem portion 26. Ring 46 does not extend across flat 48 in order to permit first core piece 20A to be removed as described below. Ring 46 may be machined directly out of the metal mold halves or it may be a separate part (such as epoxy) inserted into a corresponding groove in the mold halves.

Figure 5:
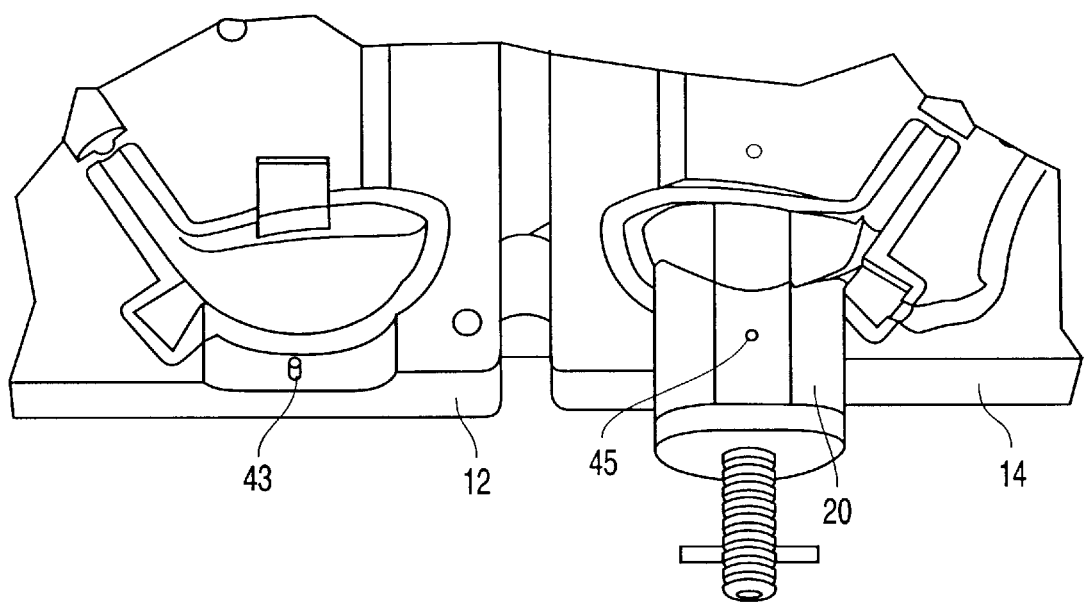
FIG. 5 is a partial perspective view of a portion of an open mold and core according to an alternative embodiment of the invention.
Figure 14:
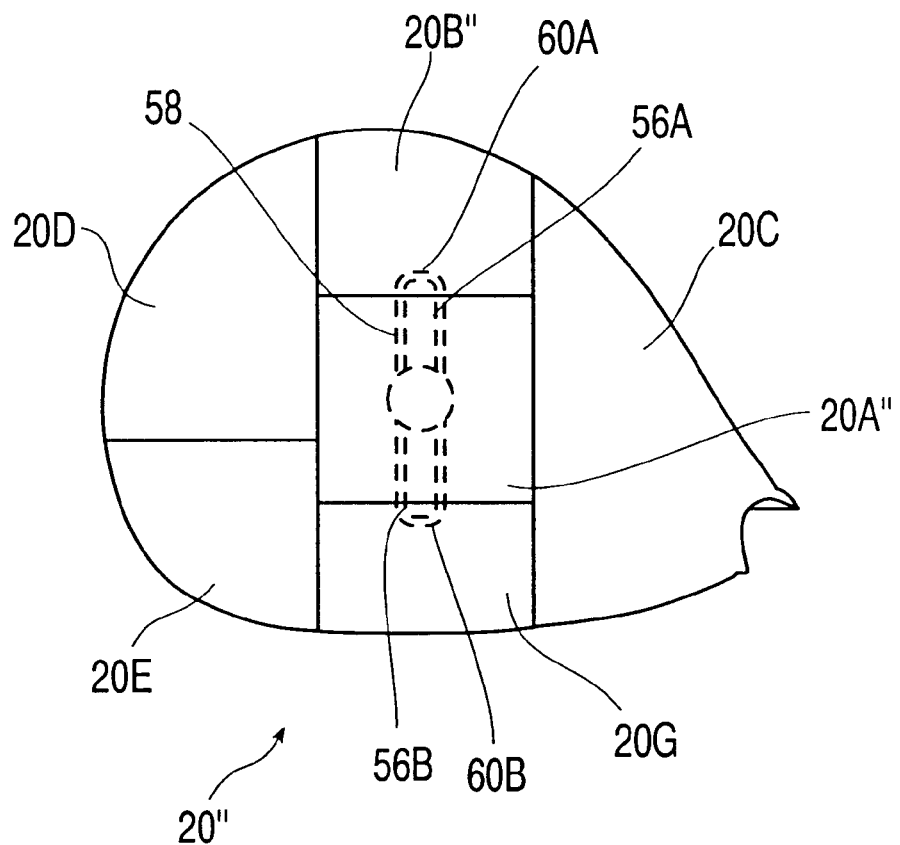
FIG. 14 is a plan view of a core having an alternative locking means shown in hidden lines.

The interfitting of registration channel 28 and registration ring 46 provides a precise and positive location for core 20 within the mold cavity. In this manner the location cannot be accidentally varied and is not dependent upon a degree of wedging or other force applied between mating parts. Alternatives to the ring and channel may be used. For example, discontinuous ring segments or individual, short pins may be used. FIG. 5 illustrates the use of pin 43 received in hole 45 in core 20 to replace the registration ring and channel. A similar pin and hole on the opposite mold half and side of core 20 are not visible in the figure. Pins also may be employed in pairs. Various key and keyway constructions would also be suitable for positively guaranteeing proper registration as between the mold cavity and core. Whatever registration means is used in combination with the core pieces, it should permit a first piece to be removed when the core is stripped. For example, as shown in FIG. 14, a center core piece may be alternatively provided as the first piece to be removed.

Figure 6:
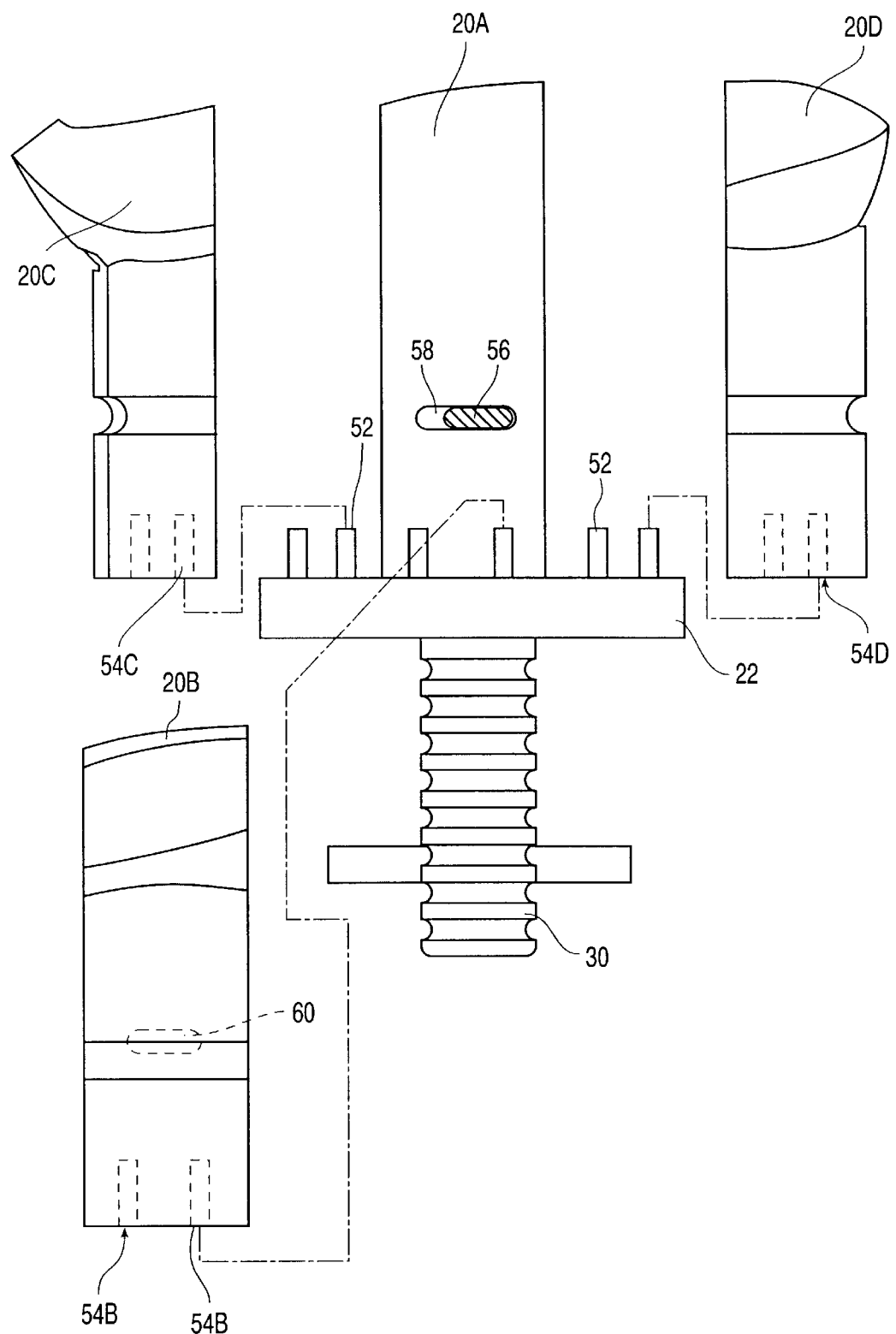
FIG. 6 is an exploded view of one embodiment of a core according to the present invention.
Figure 8:
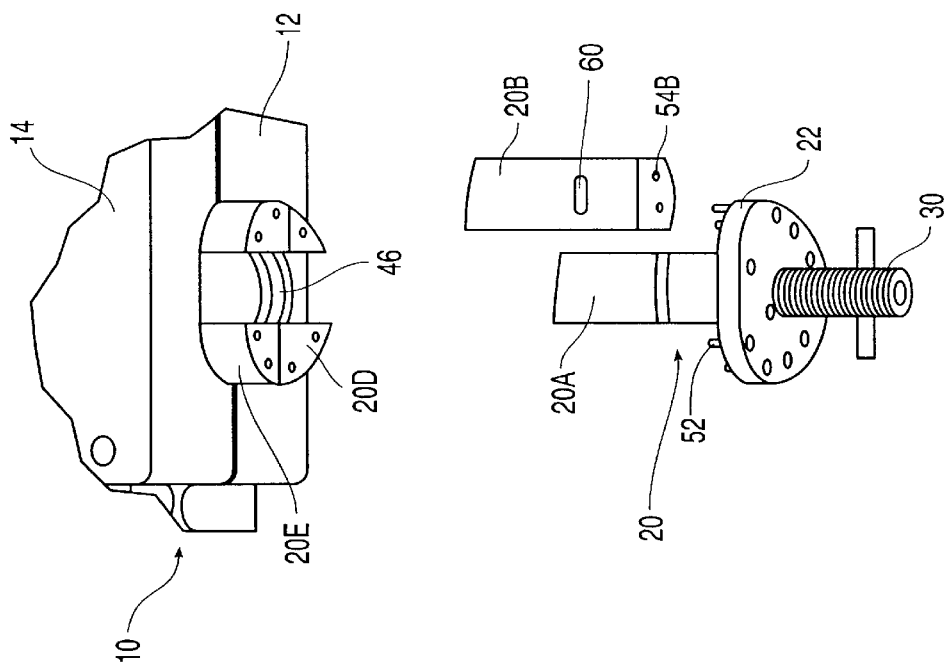
FIGS. 7–12 are partial perspective views, sequentially illustrating stripping of the core according to an embodiment of the present invention.

Referring to FIG. 6, assembly and placement of the core will be described. Base plate 22 has a number of upstanding pins 52 which closely mate with holes 54B–F in the bottom of core pieces 20B–F. The fit between the pins and holes should be close enough so that the core pieces do not wobble when placed thereon, but also loose enough to allow easy placement and removal of the core pieces. Core piece 20A is fixed to base plate 22 by screws or other suitable means. Handle 30 extends into core piece 20A and cooperates with locking finger 56. Locking finger 56 is disposed in slot 58 on the interior surface of core piece 20A and rotates in and out when handle 30 is rotated in the corresponding in or out direction. A suitable geared, cammed, pin and slot or other mechanism may be provided for this purpose by a person skilled in the art. The interior surface of core piece 20B, which mates with core piece 20A, is provided with locking slot 60 to receive locking finger 56. Other than slots 58 and 60, the interior mating surfaces of the core pieces are preferably, but not necessarily, square and free of slots, grooves or ridges in order to provide a close and relatively seam free fit. To assemble core 20, each core piece 20B–F is placed over its corresponding pins 52 on base 22 with its interior surfaces mating with adjacent core pieces. Handle 30 is turned to cause locking finger 56 to engage locking slot 60. The core thus assembled appears as shown, for example, in FIG. 2. The assembled core 20 is then placed in the open mold as shown in FIG. 4. Once placed in mold 10, registration ring 46 engages registration channel 28 to ensure the proper location of the core within the mold cavity. The mold is then closed and the cavities are filled with wax via channel 32 as is known in the art.

Figure 7:
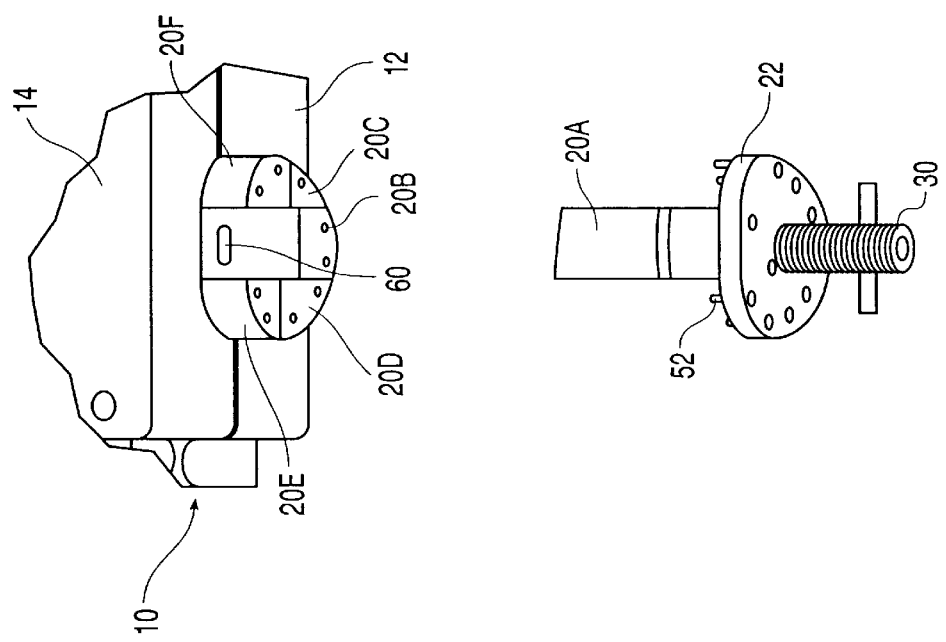
Figure 10:
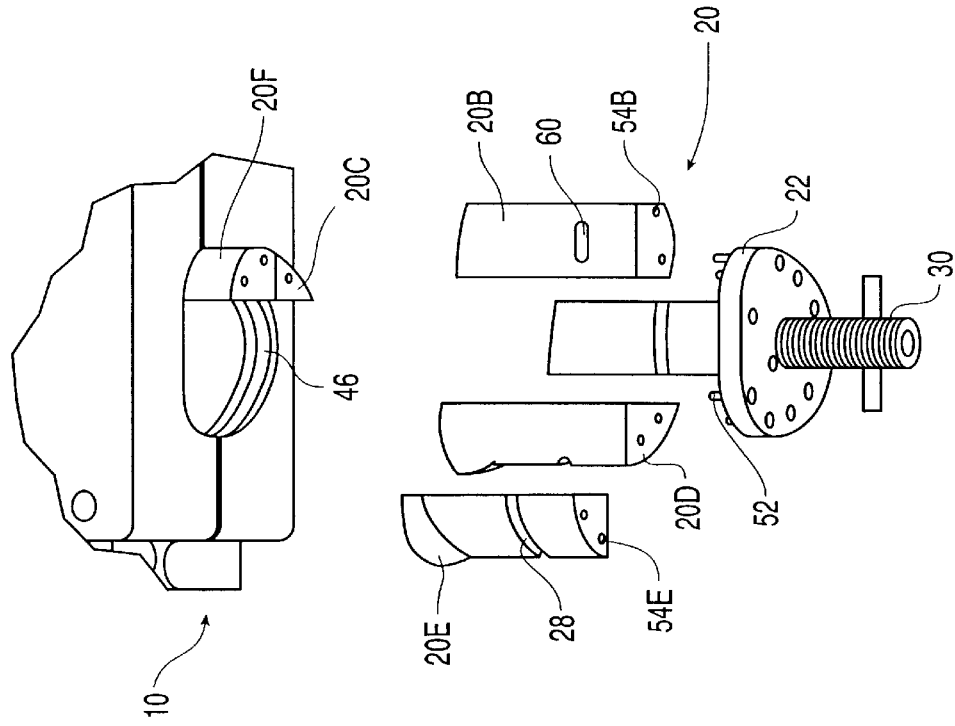
Figure 9:
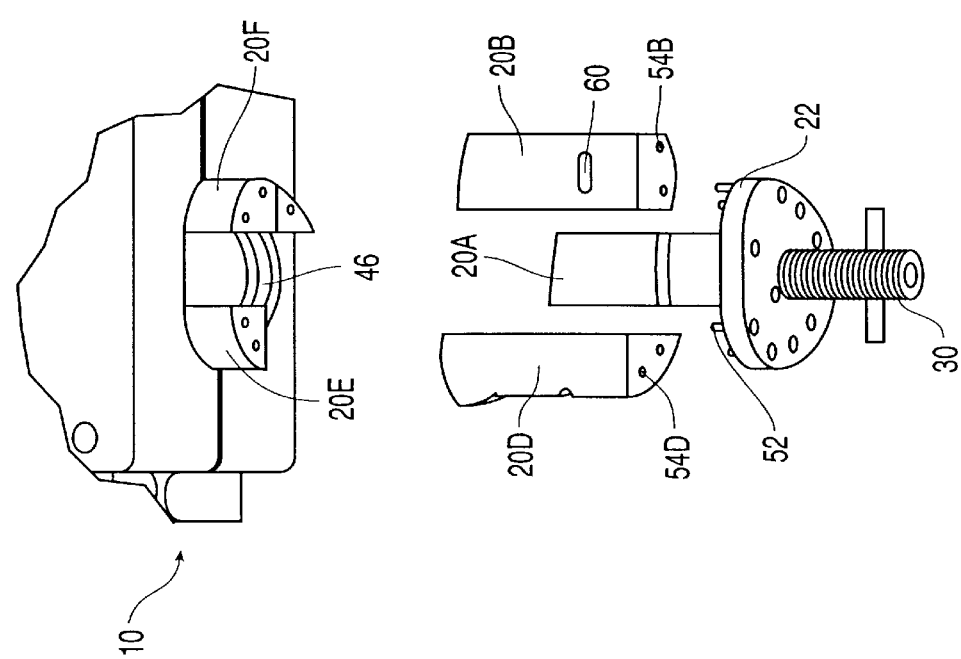
Figure 12:
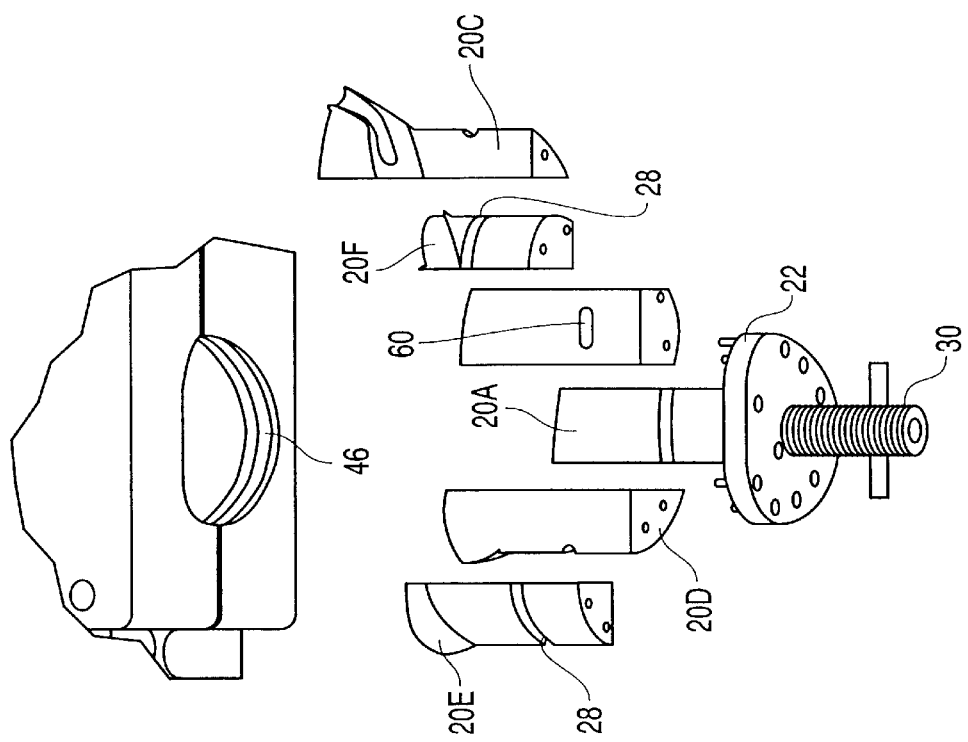

Once the wax pattern has cooled to the desired degree, the core may be stripped, without opening the mold. In this manner, the dimensional integrity of the wax pattern is ensured. Handle 30 is rotated to move locking finger 56 into core piece 20A and disengage it from core piece 20B. Once this is done, core piece 20A, including base plate 22 and handle 30, may be removed from the mold, without opening the mold as shown in FIG. 7. This can be accomplished because flat 48 (which provides a break in registration ring 46) mates against the outside of core piece 20A, permitting its sliding removal once the locking finger is disengaged. Removal of core piece 20A with base plate 22 also causes pins 52 to be removed from the other core pieces. With the pins removed, the other core pieces may be sequentially, laterally moved into the void left by core piece 20A and then withdrawn through the opening in the sole plate of the club head as shown in FIGS. 8–12.

Figure 13:
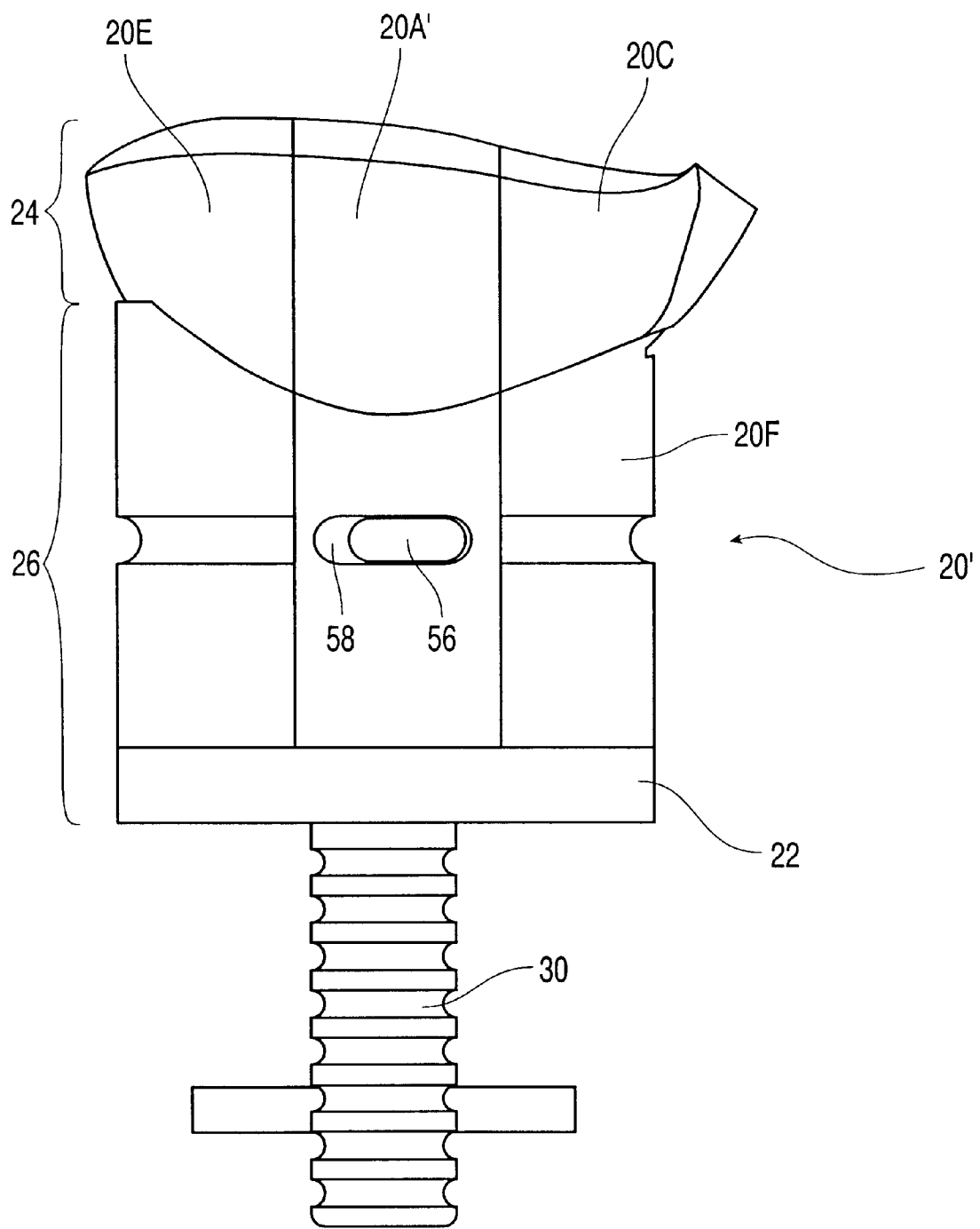
FIG. 13 is a side view of an alternative core according to the present invention.

An alternative embodiment of the invention is shown in FIG. 13. In this embodiment, core 20' is provided with locking finger 56 on the outside of core piece 20A'; which extends outward in the locking position, rather than locking internally as in the previous embodiment. Thus, locking slot 60 instead is provided in flat 48 on mold half 14 to receive the locking finger. This alternative is otherwise as described above in connection the embodiment of FIGS. 1–12.

Another alternative embodiment is illustrated in FIG. 14. In this embodiment, core 20" is provided with a double finger mechanism 56A, 56B. An additional, outer core piece 20G is provided so that first core piece 20A" is a center piece. Finger 56A extends from center core piece 20A" into slot 60A in outer core piece 20B". Similarly, finger 56B extends from center core piece 20A" outward, into slot 60B in outer core piece 20G. The double finger arrangement provides more secure holding and greater stability for the core. Also, because first core piece 20A" is a center piece, the registration channel and ring (or other registration means) may engage every outer core piece to provide further stability for the core and still permit the first core piece to be removed without opening the mold.

Figure 15:
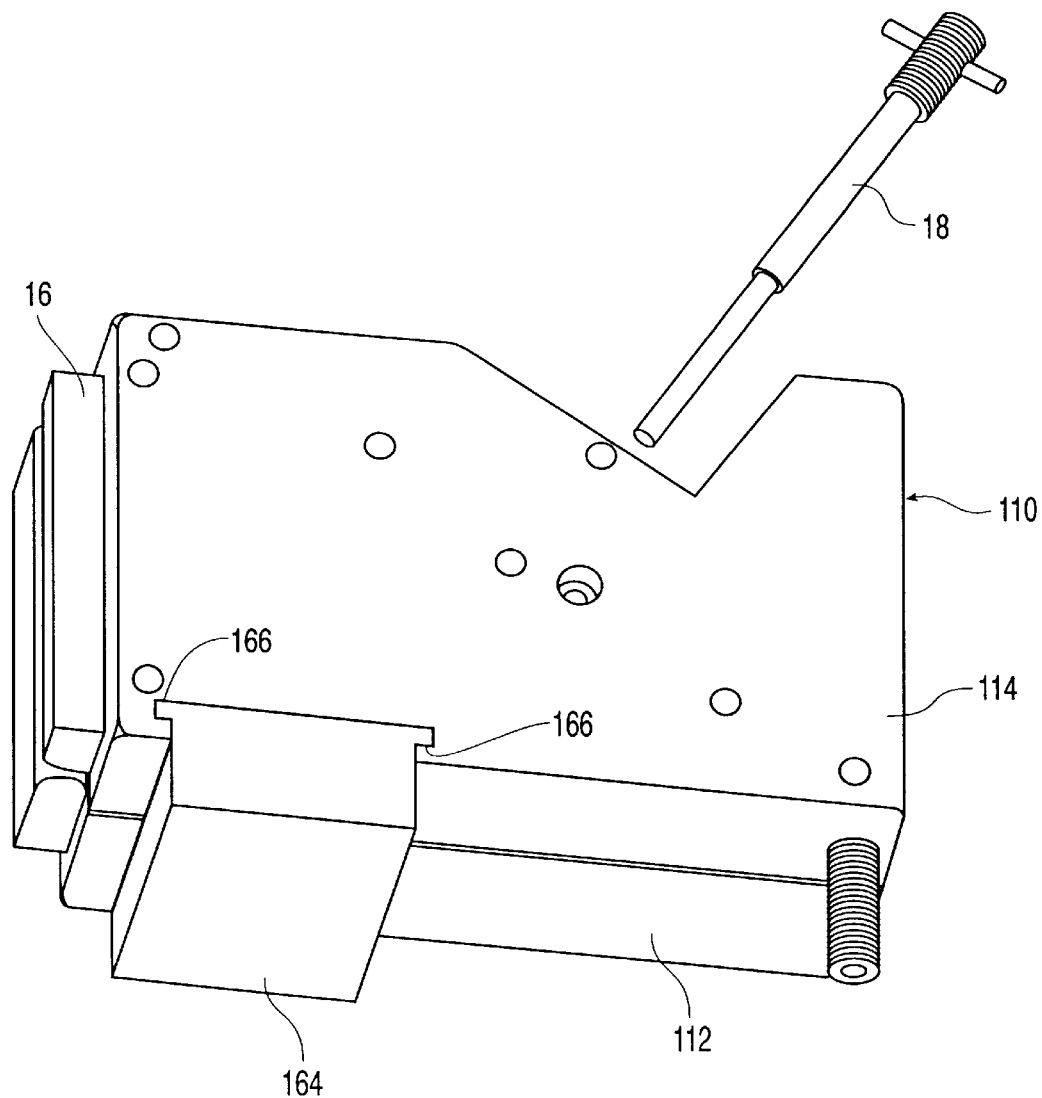
FIG. 15 is a perspective view of an alternative mold according to a further embodiment of the present invention.
Figure 16:
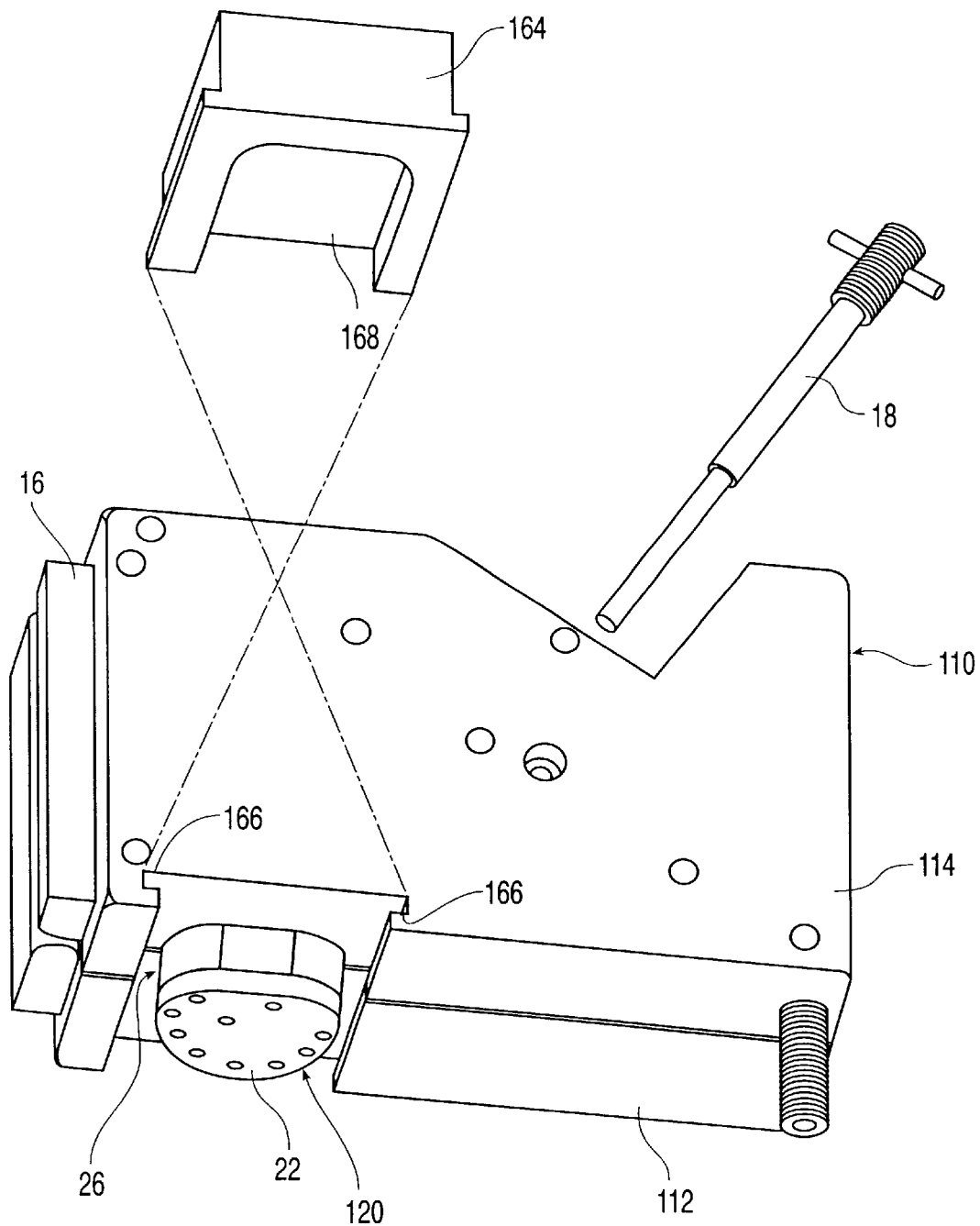
FIG. 16 is a perspective view of the mold shown in FIG. 13 with the locking gate removed.

In a further alternative embodiment shown in FIGS. 15 and 16, mold 110 employs locking gate 164 instead of a locking finger and slot. Core 120 is assembled as explained above except for the lack of locking finger and slot. Registration ring 46 and channel 28 may be used to ensure proper registration of the core within the mold. However, in order lock the core pieces in the mold during the molding process, locking gate 164 is slid into locking grooves 166 on both mold halves 112, 114. Locking gate 164 abuts against base plate 22 of core 120 to prevent its movement. As shown in FIG. 16, recess 168 may be provided to receive base plate 22 and the extending part of core stem portion 26. Once the wax pattern has suitably hardened, the locking gate is removed and the core may be stripped from the mold as described above.

Figure 17:
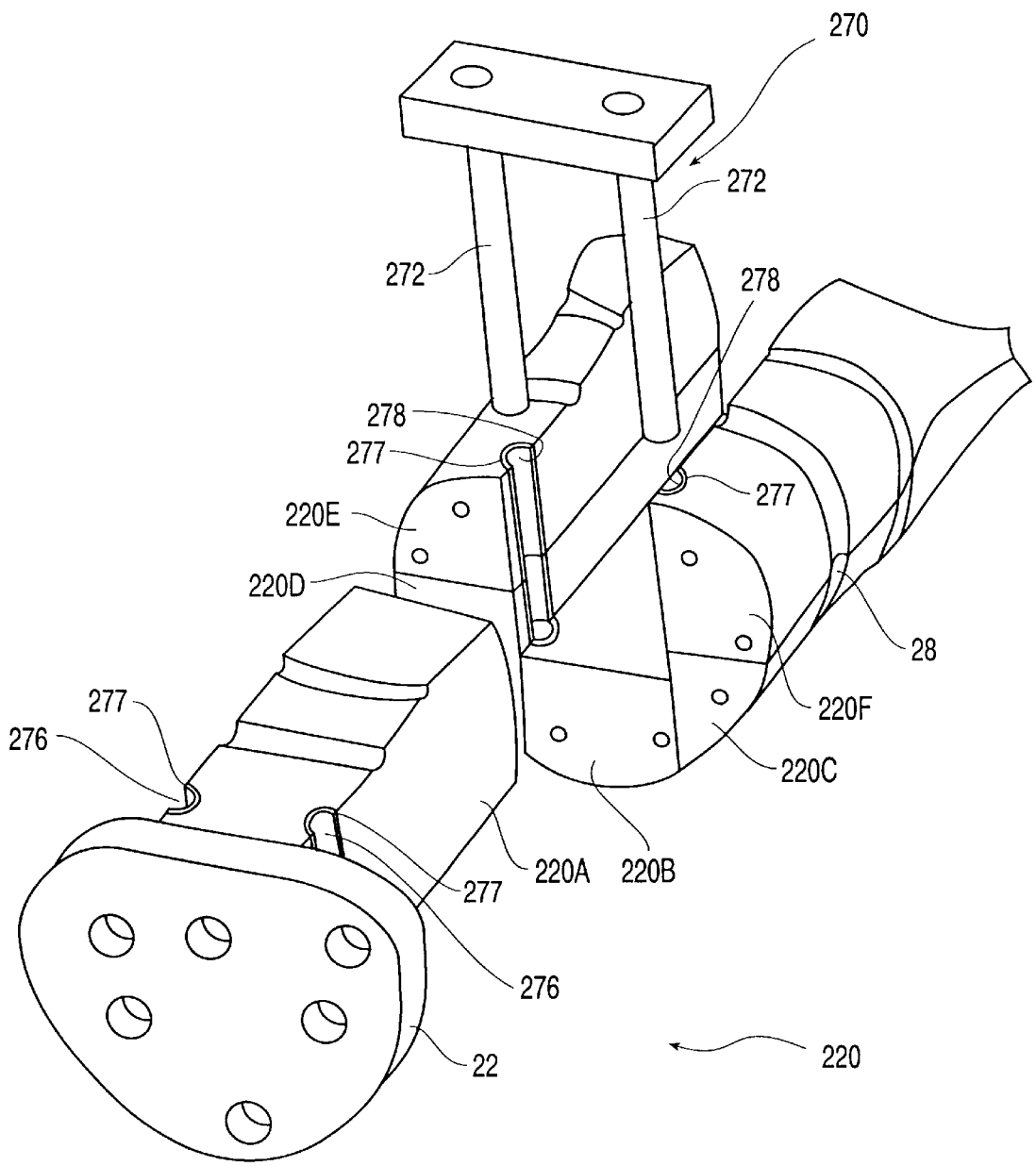
FIG. 17 is an exploded perspective of an alternative core and locking means according to the invention.
Figure 18:
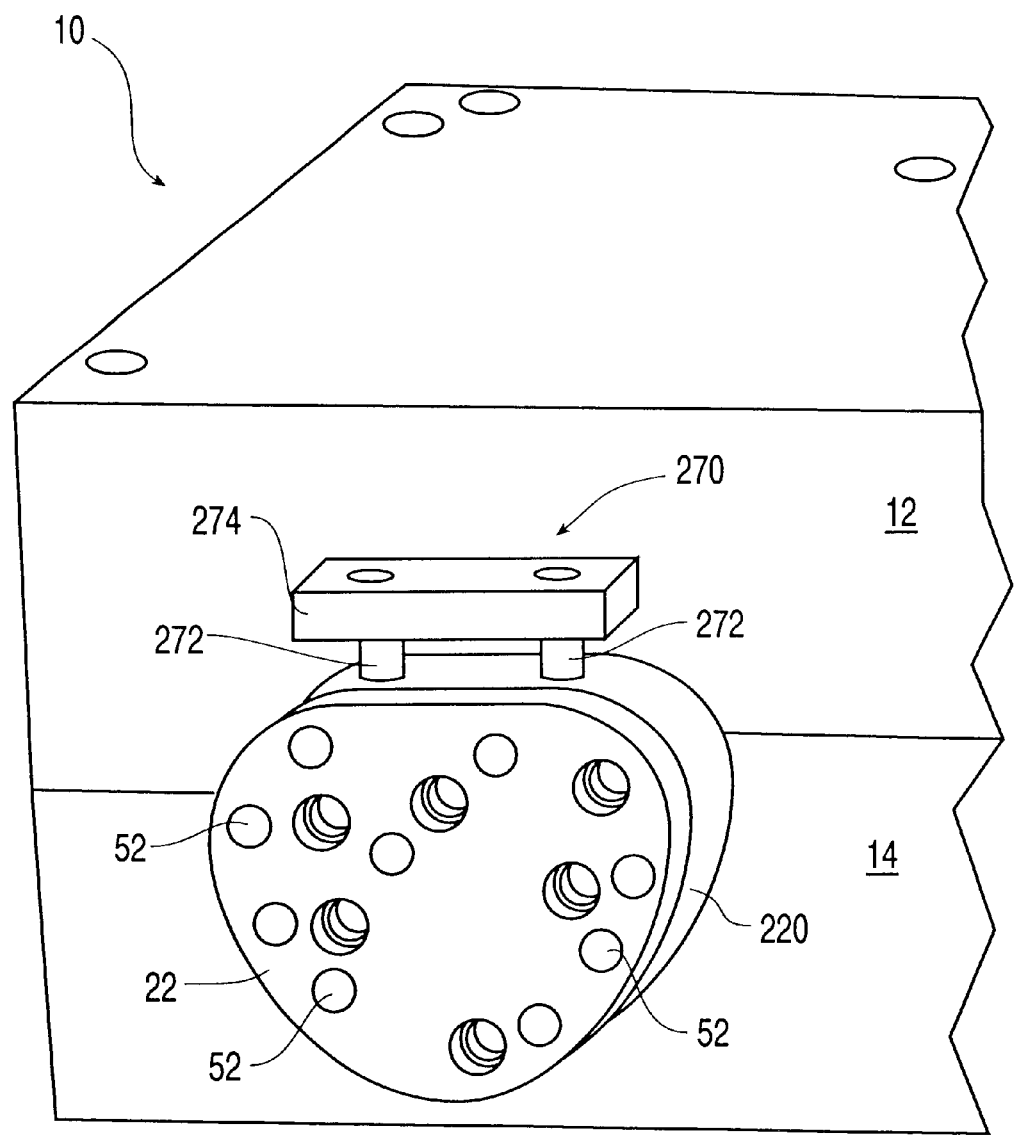
FIG. 18 is a partial perspective view of a closed mold using the core and locking means shown in FIG. 17.

An additional alternative embodiment is shown in FIGS. 17 and 18. In this embodiment the locking means comprises a double dowel arrangement rather than the lever arrangement previously described. Here, double dowel member 270 has two dowels 272 extending parallel from handle 274. Alternatively, a single dowel may be used in the same manner. First core piece 220A has two half-channels 276 which align mating half-channels 278 on core pieces 220E and 220F, respectively, when the core is assembled. The half channels may be lined with bushings 277, such as brass or bronze if desired. Thus, when the core is assembled, holes are formed by the mated half-channels to receive dowels 272 and lock together the core pieces. As shown in FIG. 17, it is preferred that the half-channels are also formed in mating relationship in core pieces 220D, 220B and 220C so that dowels 272 may directly lock all core pieces. Pins 52 (not shown) are used as previously described to hold together the core pieces in a lateral direction. The pins may be mounted in base plate 22 or passed through appropriately sized holes in the base plate. Also as shown in FIG. 17, the registration means comprises channel 28. Alternative registration means such as keys, pins, etc. previously described, may be used.

FIG. 18 shows the assembled mold 10 using alternative core 220. Core 220, when employing channel 28, may be used with mold halves 12 and 14, previously described. In an alternative preferred embodiment core 220 is provided with hole 45, as shown in FIG. 5, so that pin 43 may be used as registration means. Once again, a person of ordinary skill in the art will appreciate that the core pieces must be configured in cooperation with the registration means to permit removal of the first piece without opening the mold. For example, a first center piece as in FIG. 14 may be preferable with the pin arrangement shown in FIG. 5.

Figure 19:
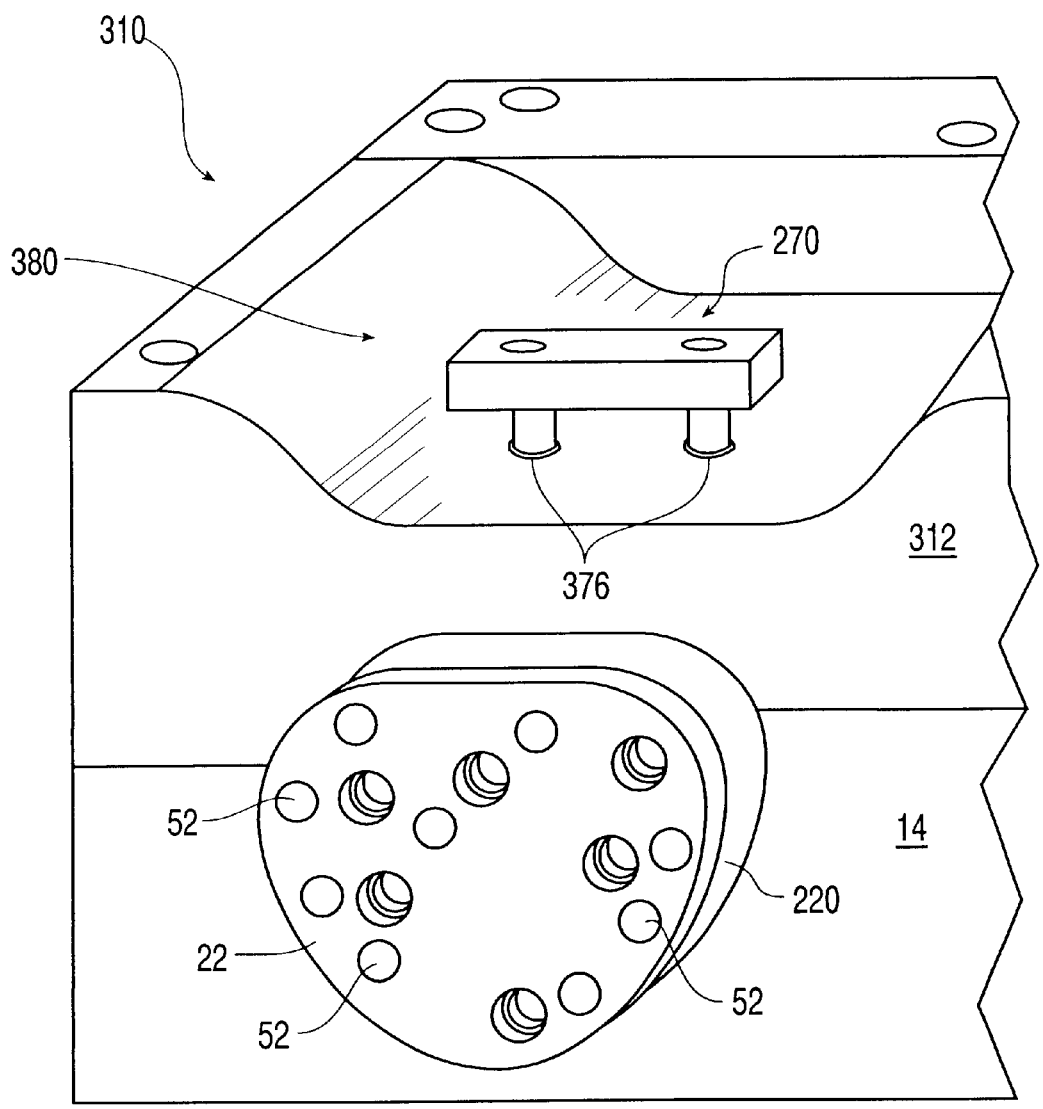
FIG. 19 is a partial perspective view of a closed mold according to another alternative embodiment of the invention.

FIG. 19 illustrates yet another alternative embodiment. In this embodiment, upper half 312 of mold 310 is provided with dished area 380 to permit double dowel member 270 as previously described to be passed through lined holes 376 and into core 320. By passing dowels 272 through upper mold half 312, greater security of the core parts may be achieved. Core 320 is otherwise formed in a similar configuration to core 220, previously described. With core 320 only a single registration pin 43 and hole 45 is required between the core and lower mold half 314.

As will be apparent to persons of ordinary skill in the art, various modifications and adaptions of the structure and method above described will be possible without departure from the spirit and scope of the invention, the scope of which is defined in the appended claims. For example, a person of skill in the art may elect to provide a suitable taper to selected interfitting parts such as various pins or dowels to facilitate sliding fits and compensate for machining tolerances without departing from the scope of the invention.

What is claimed is:

1. A method for forming a wax pattern of a hollow thin walled object, comprising:

providing a wax pattern mold made up of at least two parts together defining a cavity configured and dimensioned to form the outside of the wax pattern;

placing a core configured and dimensioned to form the hollow inside of the wax pattern wherein said core is comprised of multiple core parts, said placing including registering the core with the mold cavity to ensure dimensional integrity of the thin walls of the object;

closing the mold parts together;

locking the multiple core parts together in a step separate from said placing step, wherein said locking step comprises turning a handle on the core to extend a locking finger from one core part into an adjacent core part;

flowing molten wax into the mold cavity;

permitting the wax to harden to form the thin walled wax pattern;

removing the core while maintaining mold parts closed;

opening the mold parts; and removing the wax pattern.

2. The method according to claim 1, further comprising forming the mold cavity and core to provide a wax pattern in the shape of a golf club head.

3. The method according to claim 1, wherein said mold parts define an upstanding member which is received in a corresponding recess on said core to provide said registering.

4. A method for forming a wax pattern of a hollow thin walled object, comprising:

providing a wax pattern mold made up of at least two parts together defining a cavity configured and dimensioned to form the outside of the wax pattern;

placing a core configured and dimensioned to form the hollow inside of the wax pattern wherein said core is comprised of multiple core parts, said placing including registering the core with the mold cavity to ensure dimensional integrity of the thin walls of the object;

closing the mold parts together;

locking the multiple core parts together in a step separate from said placing step, wherein said locking step comprises inserting at least one dowel into a hole defined by mating locking slots in adjacent core pieces;

flowing molten wax into the mold cavity;

permitting the wax to harden to form the thin walled wax pattern;

removing the core while maintaining mold parts closed;

opening the mold part; and removing the wax pattern.

5. The method of claim 1, wherein:

said placing includes placing a core first portion in the mold such that a core second portion extends outside of the mold; and said locking includes locking the multiple core parts together from the core second portion that extends out of the mold.

6. The method of claim 1, wherein said removing includes removing the core while maintaining all of the mold parts closed.

* * * * *